(12) United States Patent
Winner, Jr.

(10) Patent No.: US 7,469,927 B1
(45) Date of Patent: Dec. 30, 2008

(54) INTERCHANGEABLE AUTOMOBILE WINDOW LOUVER SET

(76) Inventor: Paul David Winner, Jr., 4108 Lark La., Ypsilanti, MI (US) 48197

( * ) Notice: Subject to any disclaimer, the term of this patent is extended or adjusted under 35 U.S.C. 154(b) by 55 days.

(21) Appl. No.: 11/789,506

(22) Filed: Apr. 26, 2007

(51) Int. Cl.
*B60J 1/18* (2006.01)

(52) U.S. Cl. ............... 280/762; 296/95.1; 296/152; 52/473

(58) Field of Classification Search ......... 296/95.1, 296/96, 97.1, 97.2, 97.3, 97.5, 97.7, 97.9, 296/152; 52/473
See application file for complete search history.

(56) References Cited

U.S. PATENT DOCUMENTS

| | | | |
|---|---|---|---|
| 1,119,177 A | | 12/1914 | Krafft |
| 2,318,143 A | | 5/1943 | Cutting |
| 2,738,221 A | | 3/1956 | Zwaska |
| 2,797,961 A | | 7/1957 | McKay |
| 4,006,933 A | * | 2/1977 | Simpson ............ 296/152 |
| 4,023,309 A | | 5/1977 | Backward |
| 4,121,869 A | * | 10/1978 | Hablitzel et al. ........ 296/152 |
| 4,358,488 A | | 11/1982 | Dunklin |
| 4,368,605 A | * | 1/1983 | Ulrich ............ 52/473 |
| 4,453,762 A | | 6/1984 | Deaver |
| 4,469,366 A | * | 9/1984 | Deaver ............ 296/152 |
| 4,578,901 A | | 4/1986 | Dillinger |
| 4,715,643 A | | 12/1987 | Butler |
| 4,861,090 A | | 8/1989 | Gavrieli |
| 4,986,592 A | | 1/1991 | Kaiser |
| 5,056,851 A | | 10/1991 | Horwill |
| 5,435,617 A | | 7/1995 | Stanesic |
| 5,460,425 A | | 10/1995 | Stephens |

* cited by examiner

*Primary Examiner*—Christopher P Ellis
*Assistant Examiner*—John D. Walters
(74) *Attorney, Agent, or Firm*—Robert L. McKellar; McKellar IP Law, PLLC

(57) ABSTRACT

An interchangeable automobile louver set that is adapted to be detachably mounted on a rear, downwardly, rearwardly inclined automobile window glass and includes a plurality of louvers independently horizontally mounted to a plurality of independent, vertically disposed stanchions. Each louver includes longitudinally spaced apart ends spanned by a pair of vertically spaced sides and a front edge which has a profile that conforms to the profile of the confronting portion of the window glass regardless of which vertically spaced side is uppermost. Each louver is attached by fasteners and each stanchion has the capability to be reversible without modification to the louvers or stanchions. For example, the first side of all of the louvers could match the color of the vehicle and the second side could be a standard color (i.e. black). The louvers are readily detachable and reversible to change the appearance of the automobile.

30 Claims, 3 Drawing Sheets

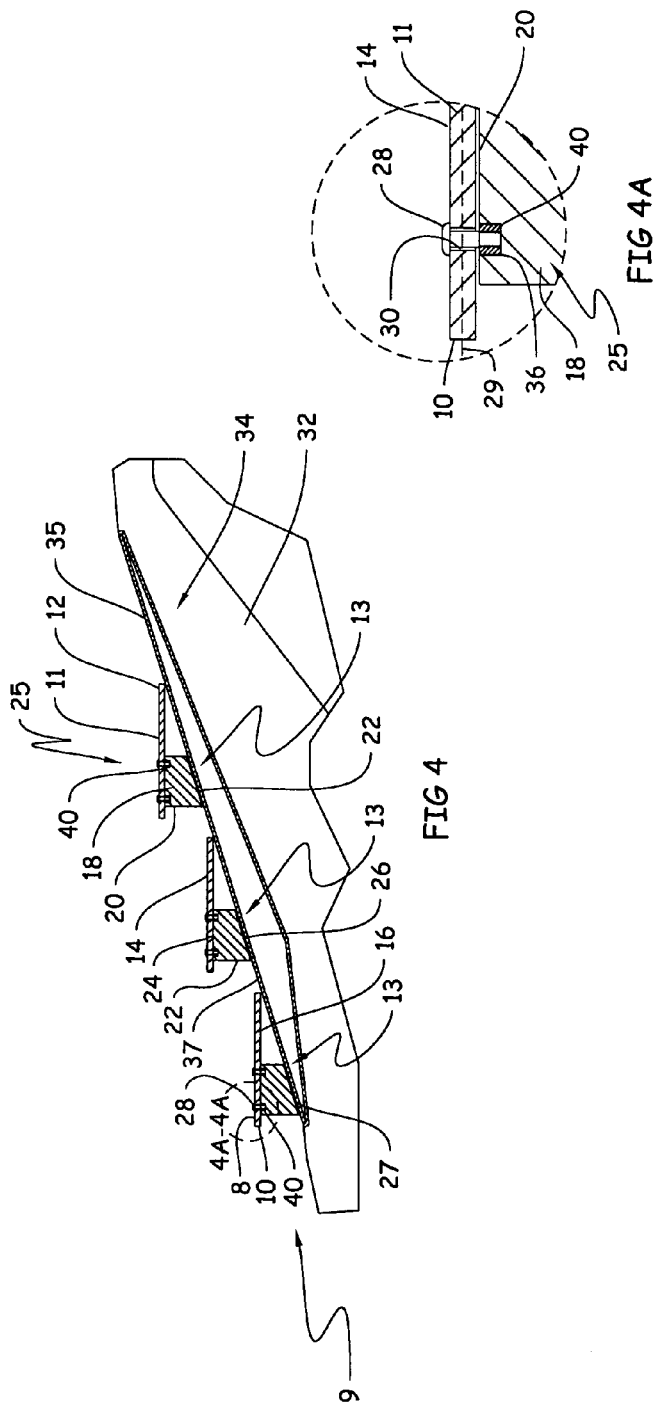
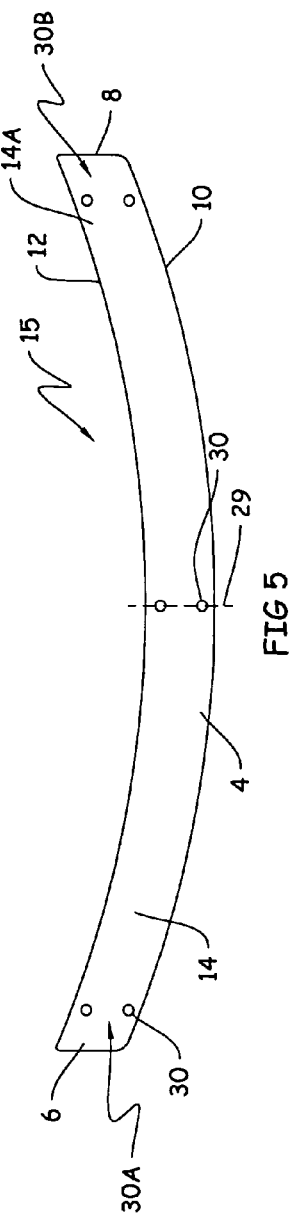

INTERCHANGEABLE AUTOMOBILE WINDOW LOUVER SET

FIELD OF THE INVENTION

This invention relates to an automobile window louver set and more particularly to a window louver set including a series of detachably mounted individual louvers that are supported by individual stanchions which are detachably mounted to an automobile window glass.

BACKGROUND AND ADVANTAGES OF THE INVENTION

The use of louver sets on automobiles is not new. There many examples of the use of louvers on automobiles as the following will exemplify.

U.S. Pat. No. 4,453,762 issued to Deaver on Jun. 12, 1984 discloses a louver system comprising a set of end caps which are mounted to an automobile with channel members spanning the end cap units. The end caps are mounted to the vehicle and the louvers are secured between the end cap units. Prior art louver constructions such as those illustrated in the aforesaid patent are mounted on a vehicle and are relatively expensive, cumbersome, and quite difficult to modify, detach, and/or present a different style, theme, scheme and/or design.

The instant invention has greater flexibility in that the louvers can be reversed to provide a multiplicity of style variations adapted to the user's personal preferences. Another advantage is that the instant invention has independently mounted louvers, therefore allowing each louver to have a different color or theme.

U.S. Pat. No. 4,578,901 issued to Dillinger on Apr. 1, 1986 discloses a louvered shade that is capable of being disassembled. This is primarily done to expedite shipment and is hingedly mounted to the automobile. This does not allow the louvers to be reversible as in the instant invention.

U.S. Pat. No. 4,715,643 issued to Butler on Dec. 29, 1987 discloses a louver system specifically for pick up trucks. This invention is similar to those noted above which includes a frame, with louvers attached to the frame, forming a unitary structure that is mounted on the automobile. Butler differs in that a portion of the louver system is removable to allow access to a sliding portion of the truck window. Butler has the capability to have a removable portion, but that portion is not reversible as in the instant invention. The instant invention has the capability of removing each louver independently and the capability to reverse those louvers.

U.S. Pat. No. 5,435,617 issued to Stanesic on Jul. 25, 1995 and U.S. Pat. No. 5,056,851 issued to Horwill on Oct. 15, 1991 both disclose rear window visors that are used singularly. The Stanesic deflector is mounted on brackets that mount to the window frame. The Horwill patent discloses a one-piece visor having a main body and integral dependent sides affixed directly to the window by adhesive and not detachably mounted to individual, independent stanchions. Both of these prior art constructions can be removed but are not reversible. The instant invention uses a plurality of louvers mounted on independent stanchions that mount directly to the window and are removable and reversible.

The present invention is mounted exclusively on the window glass inwardly of the window frame and cantileverly supports the ends of the louvers adjacent the end of glass and/or over the frame but without connecting the louvers to the frame.

The present invention is also advantageous because it is substantially less expensive to change and mount a louver set on the vehicle. The prior art routinely hingedly mounts the louver assembly such as in the aforecited U.S. Pat. No. 4,453,762.

It is another advantage of the present invention to independently mount each louver on one or more mounting members which are independent of the mounting members for the remaining louvers. In this way, if one of the louvers is broken, it may be inexpensively replaced.

The present invention includes a plurality of louvers, which have different indicia, such as different color, on vertically opposite sides of the louvers, to selectively present a variety not otherwise available.

It is another advantage of the present invention to provide independent mounts which cantileverly independently support each louver on the vehicle glass.

THE INVENTION

An automobile window louver assembly set comprising a plurality of louver mounting stanchions and a plurality of individual louvers. The stanchions are adhesively affixed directly to an automobile window. Attached with fasteners to the mounting stanchion is a plurality of reversible and detachable louvers. These louvers each have a front edge, a rear edge, and vertically spaced apart side surfaces. The louvers are each configured in a manner that the front edge has a profile which, regardless of whether either of the vertically spaced apart surfaces is uppermost, conforms to the profile of the automobile window glass. The removable louvers, which are reversible, include vertically spaced apart sides having a variety of different schemes, themes, and/or designs.

BRIEF DESCRIPTION OF THE DRAWINGS

FIG. 4 is a greatly enlarged sectional end view taken along the section line 4-4 of FIG. 3;

FIG. 4A is a greatly enlarged sectional end view of the portion illustrated in the chain line circle 4A of FIG. 4, more particularly illustrating one of the fasteners; and FIG. 5 is a greatly enlarged top plan view of an individual louver.

DETAILED DESCRIPTION OF THE DRAWINGS

Figure 2:
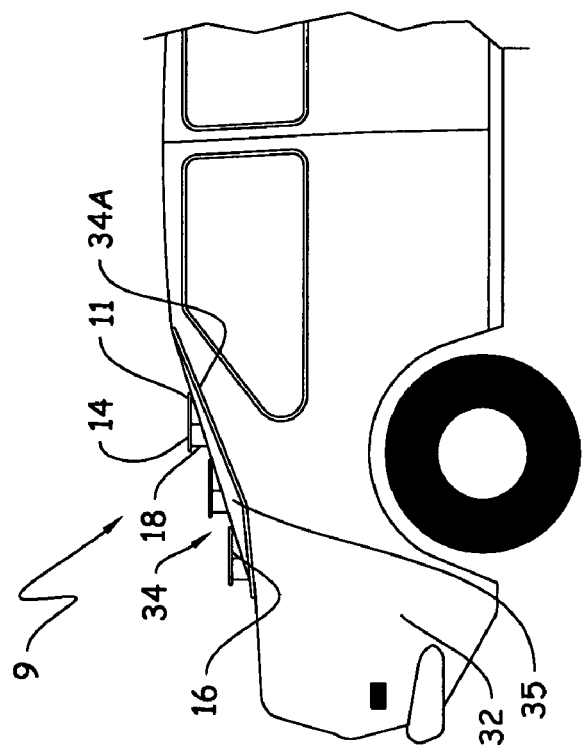
FIG. 2 is an end elevational view of the interchangeable louver set of FIG. 1 constructed according to the present invention, but only a rear portion of the automobile on which the louver set is mounted.
Figure 1:
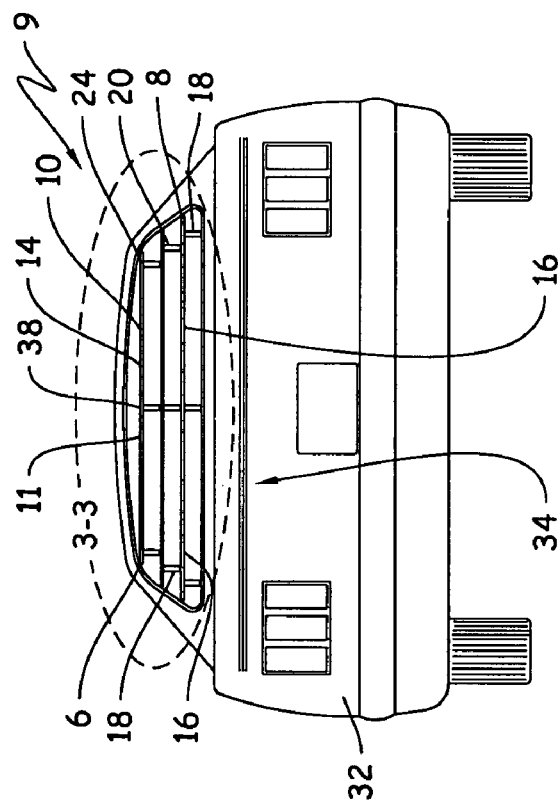
FIG. 1 is a rear elevational view illustrating an interchangeable automobile louver set, constructed according to the present invention, mounted on the rear window of an automobile.

A louver set, constructed according to the present invention and generally designated 9, is particularly adapted for use with a rear window, generally designated 34, having a perimetrically extending window frame 34A mounting a downwardly, rearwardly inclined rear windowpane or glass 35 at the rear of an automobile 32. The louver set 9 includes a plurality of vertically and horizontally or laterally staggered rows 13 of individual, independent louver mounts, generally designated 13A.

Each row 13 of mounts 13A includes a plurality of horizontally spaced apart, upstanding, individual, independent, louver mounting stanchions 18 having near or upper ends 20 and distal or lower ends 22.

The louver set 9 also includes a plurality of elongate louvers or louver slats 11 each having longitudinally spaced apart, opposite terminal end edges 6 and 8 and an intermediate louver portion 15 between the end edges 6 and 8. Each louver has front and rear curved edges 12 and 10, respectively, and first and second vertically spaced apart sides 14 and 16 spanning the end edges 6 and 8. Although the drawing illustrates side 14 as being uppermost, it should be understood that the louvers 11 are symmetrical such that the opposite vertically spaced apart louver side 16 could also have been uppermost with the front edge 12 remaining in the position illustrated in the drawing.

The interchangeable louvers 11 are individually mounted devices and not a structure containing a frame and component parts. The stanchions 18 are individually affixed to the underlying, confronting portions of the outer or exterior surface 37 of the automobile rear window glass 35 which typically is horizontally, forwardly curved or inclined between longitudinally spaced apart ends. The two longitudinally spaced apart, outermost ones of the stanchions 18 in each row 13 are equidistantly spaced from the middle one of the stanchions. The distal or lower end 22 of each stanchion 18 is adhesively fixed to the confronting surface portion 37 of the window glass 35 with any suitable adhesive, such as double sided tape 27, sandwiched between the bottom surface 26 of the distal or lower end 22 of the stanchion 18 and the confronting portion of window glass 35.

The near or upper end 20 of each stanchion 18 has one or more openings 36 in the top stanchion surface 24 to threadedly accept threaded fasteners 25 and detachably secure the louvers 9 to the stanchions 18. Each louver 11 is placed with either the first side 14 or the second side 16 facing upward and then fastened to the upper stanchion ends 20 by the fasteners 25. Each louver 11 is mounted on a minimum of two stanchions 18, although three are illustrated, one at the near end 6, one at the distal end 8 and one at the middle 38. If only two stanchions 18 are provided in each row 13, they may be spaced apart by a distance equal to the distance of each stanchion from either a central stanchion axis 29 or the longitudinally outer terminal edges 6 and 8 of the louver 9 mounted thereon. Each louver 11 is symmetrical and, whether the louver 11 is disposed with either of the louver sides 14 and 16 facing upwardly, the front edge 12 has a profile which is complementally formed to the profile of the confronting portion of the window glass 35. The rear edge 10 of each louver 11 faces rearwardly away from the window 34 regardless of which of sides 14 and 16 is uppermost. If an even number, such as 4, of stanchions 18 are provided in each row 13, the stanchions may be spaced apart in symmetric pairing by a distance equal to the distance from either the central axis 29, or the longitudinally outer terminal edges 6 and 8 of the louver 11 mounted thereon.

The number of louvers 11 and stanchions 18 vary, depending on the size of the rear window 34 of the automobile 32.

The fasteners 25 may suitably comprise threaded bolts 28 which are slidably received by the louver openings 30 and have terminal ends threadedly received by internally threaded ferrules 40 embedded in the stanchion openings 36 (FIG. 4A). FIG. 4 additionally illustrates the individual relationship of each louver 11 to the other. The bottom surfaces 26 of the stanchions 18 in each row 13 are formed with a profile to match or conform to the profile of the underlying portion of the window glass 35. Each stanchion rises vertically away from the window glass 35 to the upper stanchion end 20 which has a generally horizontally disposed upper surface 24 to which the louver 11 is horizontally attached. Each louver 11 is surmounted upon the stanchions 18 in each row 13 with the first side 14 being illustrated in the drawings as facing upward and the second surface 16 facing downward confronting the upper stanchion surface 24.

This is the essence of the invention, in that the first side 14 and the second side 16 are interchangeable to the extent that the louver 11 can be detached from the underlying stanchion and turned over end for end or rotated, in the direction of arrow 31 (FIG. 3), about the central louver axis 29, which extends horizontally, or laterally as illustrated in FIG. 5, and then refastened to the underlying stanchions. The louver 11 can be surmounted with the second side 16 facing upward and the first side 14 facing downward at anytime. This feature allows the user to selectively, easily, and quickly change the theme, scheme, or outward appearance of the interchangeable louver set as desired. The louvers 11 are simply detached by removing the fastener bolts 28. The detached louvers are then flipped over end for end, or rotated about axis 29 in the direction of arrow 31 (FIG. 3), and reattached to the underlying stanchions 18 with the fastener bolts 28. There is no other disassembly required such as changing or moving the stanchions 18.

Figure 3:
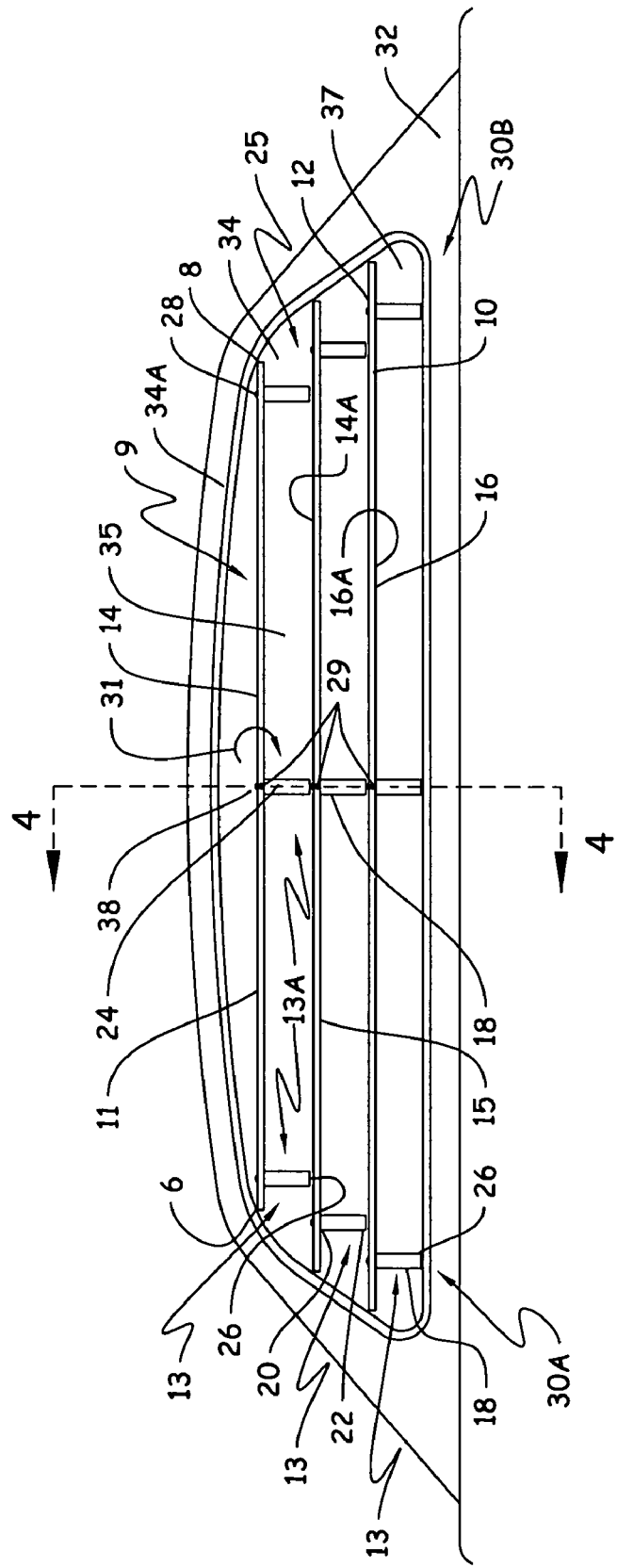
FIG. 3 is a greatly enlarged rear elevational view, similar to FIG. 1, but illustrating only the portion included in the chain line circle 3-3 of FIG. 2.

FIG. 3 additionally illustrates the individuality of each louver 11 in the interchangeable louver set 9. The bottom surface 26 of the distal end 22 of each stanchion 18 is affixed to the window glass 35 by any suitable adhesive such as double sided tape 27. The top surface 24 of the near end 20 of each stanchion 18 has an opening 36 adapted to surmount the louver 9 with fasteners 28. FIG. 3 additionally illustrates the relative relationship between the positions of the stanchions 18 and the louvers 11. There is a stanchion 18 longitudinally inward of each louver ends 6 and 8 which, as illustrated, are cantileverly supported thereon. There is also a stanchion 18 illustrated at the longitudinal middle 38 of each louver 11. The louvers 11 are surmounted on the stanchions 18 with the first side 14 being illustrated as facing upwardly and the second side 16 facing downwardly, but they are interchangeable. The rear edge 10 and the front edge 12 of each louver 11 are always facing rearwardly and forwardly, respectively, regardless of which of the sides 14 and 16 is facing upwardly. The rear edge 10 always faces away from the window glass 35 and the front edge 12 always faces the window glass 35.

If desired, the stanchions 18, with or without the underlying two sided tape 27, may be removed from the window glass 35. In the louvers 11 constructed according to the present invention, the first and second vertically spaced apart louver sides 14 and 16 include layers 14A and 16A, respectively, of different indicia such as white and black ink or paint, photos, pictures, or designs so that when the louver is rotated 180 degrees about its axis 29 to an inverted, end-for-end disposition, the appearance of the louver set will appear as though a completely new unit has been installed.

In FIG. 4, the emphasis here is to additionally illustrate the ability to independently mount each louver 11. Each louver 11 is a stand alone mount and the device is used in a series to create the effect of a full window louver. This independent mounting allows the device to be interchangeable without a great deal of effort. FIGS. 4 and 5 further illustrates that, with removal of the fastener bolts 28, the detached individual louvers 11 may then be turned end-for-end, or rotated 180° about horizontal louver axis 29, and finally reattached. Whether one or all louvers 11 are interchanged, the outward appearance theme or scheme of the vehicle 32 has been altered without a great deal of labor.

FIG. 5 additionally illustrates the first side 14 and the louver openings 30 through which the fastener bolts 28 slidably pass to attach the louvers 11 to the underlying stanchions. Each louver 11 is symmetrical so that when the louver 11, as illustrated in FIGS. 3 and 5, is rotated 180 degrees, the two longitudinally outermost louver apertures, designated 30A and 30B at the left and right hand sides, respectively, of FIGS. 3 and 5, will be flipped or rotated to reverse positions identical to the illustrated positions of the apertures 30B and 30A, respectively, in FIGS. 3 and 5. In the flipped or rotated condition, the apertures illustrated at 30A & 30B in FIGS. 3 and 5 will now be positioned at the right and left hand sides, respectively, of FIGS. 3 and 5, vertically aligned with the underlying internally threaded ferrules 40 which, before rotation, were vertically aligned with apertures 30B and 30A, respectively. Of course, the middle openings 30 will remain in vertical alignment with the underlying middle threaded ferrules 40 independent of which side 14 and 16 is uppermost. Accordingly, no additional apertures, ferrules, or fasteners are required regardless of which of the louver sides 14 and 16 is uppermost.

The instant invention holds clear advantages over the prior art in that the louvers are independently affixed to the glass of the automobile. This allows for the manipulation of the louver to vary the aesthetic view or the theme, or scheme being portrayed. In other words the louvers can show one uniform color and can show another color on the second side thus allowing the owner to change that color quickly with no additional cost. The owner can alternate colors giving another effect. The louvers are provided with patterns that also can be manipulated by moving and mixing the louvers.

If one louver becomes damaged in an accident the cost of replacement is reduced if only one is broken. It can simply be replaced instead of prior art method where the whole frame of louvers would require replacement.

There is an advantage in shipping the instant invention in that all components can be shipped in a small package because the device will break down unlike the prior art devices that require a large containers to ship.

The device is simple enough that the average car owner can assemble the device further reducing cost of installation.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. An interchangeable louver set for detachably mounting on a rear, longitudinally extending, downwardly, rearwardly inclined motor vehicle windowpane, having a predetermined profile, said louver set comprising:
   a plurality of individual, independent, support means having upper and lower ends;
   adhesive means for detachably, adhesively, independently fixing said lower ends of said support means to the windowpane in longitudinally extending, laterally and vertically spaced apart rows;
   a plurality of individual elongate louvers each having
      longitudinally spaced apart opposite ends, and
      front and rear, laterally spaced apart edges and vertically spaced sides spanning said ends;
      at least said front edge, having a profile which is complemental to the predetermined profile of the windowpane, adapted to confront said windowpane, independent of which of said vertically spaced apart sides is uppermost; and
   a plurality of fastener means detachably fixing an intermediate portion of one of said vertically spaced sides, between said longitudinally spaced apart opposite ends, to said upper end of one of said support means in any selected one of said rows such that said opposite ends of said louvers are cantileverly supported by said support members.

2. The interchangeable louver set as described in claim 1 wherein said plurality of fastener means includes cooperating fastener means, detachably fixed to said intermediate portion and said upper ends of the support means for detachably mounting any selected one of said louvers in an inverted, end for end relation, to accommodate either of said vertically spaced sides being disposed in confronting relation with said upper end of one of said support means.

3. The interchangeable louver set described in claim 1 wherein one of said vertically opposite sides has a predetermined indicia thereon and the other of said vertically opposite sides has a substantially different predetermined indicia thereon substantially different than said predetermined indicia.

4. The interchangeable louver set described in claim 3 wherein said predetermined indicia has a first color and said substantially different indicia has a second color.

5. The interchangeable louver set described in claim 3 wherein said plurality of fastener means includes cooperating fastener means on said intermediate portion of each of said louvers and the confronting end of an underlying one of said support means for detachably fixing either of said vertically spaced sides in confronting relation with said upper end of said underlying one of said support means.

6. The interchangeable louver set described in claim 5 wherein said support means in any selected one of said rows comprises at least first and second longitudinally spaced apart, independent upstanding louver mounting stanchions having upper and lower stanchion ends.

7. The interchangeable louver set described in claim 6 wherein said cooperating fastener means comprises
   first and second vertically disposed internally threaded receptacles disposed in said upper ends of said first and second mounting stanchions respectively, and
   first and second, longitudinally spaced apart, vertically disposed apertures in said intermediate portion of each of said louvers disposed in such position as to be
   vertically aligned with said first and second threaded receptacles, respectively, when said one of said vertically spaced sides confronts said upper ends of said stanchions, and
      vertically aligned with said second and first threaded receptacles, respectively, when the other of said vertically spaced apart sides confronts said upper ends of said stanchions.

8. The interchangeable louver set described in claim 7 further including threaded screw means slidably received in said first and second apertures and threadedly received by either selected one of said first and second aligned threaded receptacles.

9. The interchangeable louver set recited in claim 4 wherein said vertically spaced sides of each of said louvers has predetermined indicia presenting an image substantially different from the image projected by said substantially different predetermined indicia.

10. An interchangeable louver set for mounting on a rear, downwardly rearwardly inclined, motor vehicle windowpane, said louver set comprising:
   a plurality of elongate, window louvers each having longitudinally spaced apart, opposite ends and front and rear, laterally spaced apart edges spanned by a pair of vertically spaced apart sides;

a plurality of independent louver mounts each having upper and lower ends;

first mount means for mounting said independent louver mounts in laterally and vertically spaced apart rows and including means for detachably, independently mounting said lower ends of each of said louver mounts to the downwardly rearwardly inclined windowpane; and second mount means for detachably coupling an intermediate portion of either selected one of said vertically spaced apart sides of each of said window louvers to said upper ends of said louver mounts in each row, with said longitudinally spaced apart opposite ends of said window louvers extending longitudinally outwardly beyond, and being cantileverly supported by, said louver mounts in said each row.

11. The interchangeable louver set described in claim 10 wherein said louver mounts in each of said rows comprises at least a pair of longitudinally spaced apart upstanding stanchions each having a lower end stanchion surface complementally formed to a confronting portion of the windowpane, and an upper end stanchion surface formed complementally to a confronting portion of said one vertically spaced apart side of said window louver mounted thereon.

12. The interchangeable louver set described in claim 11 wherein said upper ends of each pair of said stanchions in each row include at least first and second longitudinally spaced apart vertical mount means;

said louver mounted on each pair of stanchions in each row, includes third and fourth longitudinally spaced, cooperating vertical mount means which are vertically aligned with said first and second vertical mount means, respectively, when said one of said vertically spaced apart sides confronts said upper surfaces of said longitudinally spaced apart stanchions in each vertically spaced apart row, and which are vertically aligned with said second and first vertical mount means, respectively, when the other of said vertically spaced apart sides confronts said upper surfaces of said stanchions in the row.

13. An interchangeable louver set for mounting on a rear, longitudinally extending downwardly, rearwardly inclined, motor vehicle windowpane, said louver assembly comprising:

a plurality of longitudinally extending, independent, window louvers, having vertically spaced apart sides provided with first and second longitudinally spaced apart vertically disposed mounting means extending between said sides;

a plurality of vertically and laterally staggered rows of longitudinally spaced apart, upstanding support stanchions, each of said stanchions having a lower end for mounting on the windowpane and an upper end conforming to a confronting portion of one of the louvers mounted thereon;

said upper ends of at least first and second stanchions in at least one of said rows including third and fourth, vertically disposed third and fourth cooperating mounting means which are vertically aligned with said first and second mounting means, respectively, when said louver is in one position in which one of said vertically spaced sides bears against said upper ends of said first and second stanchions and vertically aligned with said second and first vertically disposed mounting means, respectively, when said one louver is inverted and the other of said vertically spaced sides bears against said upper ends of said first and second stanchions.

14. The interchangeable louver set described in claim 13 wherein said vertically spaced apart sides each includes an intermediate side portion disposed between said ends; and said first and second mounting means comprising first and second apertures extending between said intermediate portions of said vertically spaced apart sides such that said longitudinally spaced ends are cantileverly supported by said stanchions.

15. The interchangeable louver set described in claim 14 including means for detachably adhesively fixing said lower ends of said stanchions to said windowpane.

16. The interchangeable louver set described in claim 15 further wherein said third and fourth apertures include internally threaded, upstanding receptacles disposed therein; and further including first and second threaded fastener means slidably received in each of said first and second apertures and threadedly coupled to one of said internally threaded receptacles in said third and fourth apertures.

17. The interchangeable louver set described in claim 16 wherein each of said louvers, when detached from said stanchion, is rotatable about a rotational axis which extends in a front to rear, generally horizontal direction, intersects said front and rear edges, and is disposed equidistantly between said third and fourth apertures;

each of said louvers being symmetrical about said axis and selectively rotatable 180 degrees in either rotational direction about said axis to selectively invert said louver and dispose either selected one of said vertically spaced sides to face upwardly or downwardly.

18. An interchangeable louver set for detachably mounting on a rear automobile windowpane having a predetermined outer profile, said louver set comprising:

a plurality of louver mounting stanchions each having upper and lower ends;

a plurality of longitudinally extending window louvers each having longitudinally spaced opposite ends, a front edge, a rear edge, and first and second vertically spaced sides spanning said front and rear edges and said longitudinally spaced opposite ends;

adhesive means for adhesively fixing said lower ends of each said plurality of mounting stanchions to the automobile windowpane; and fastener means for detachably fastening said upper end of each of said stanchion to an intermediate louver portion between said longitudinally spaced ends of at least one of said louvers;

said removable louvers being reversibly mounted on the stanchions such that either selected one of said first and second vertically spaced apart sides is downwardly disposed in confronting relation with said upper end of one of the stanchions and the other of said vertically spaced sides is upwardly disposed;

said front edge of said louvers is longitudinally symmetrical and having a profile conforming to the outer profile of the automobile window independent of which of said first and second vertically spaced sides confronts said upper end of said stanchion.

19. An interchangeable automobile windowpane louver set comprising:

a plurality of longitudinally extending window louvers each including longitudinally spaced apart opposite ends, laterally spaced front and rear edges spanning said ends, and first and second vertically spaced apart sides spanning said opposite ends and said front and rear edges;

a plurality of louver mounting stanchions, having upper and lower ends, adhesive means for adhesively fixing said lower ends of said plurality of stanchions to an automobile windowpane; and a louver fastener detachable coupling said plurality of louvers to said upper ends of said plurality of stanchions;

said front edge of each of said louvers conforming to the profile of a confronting portion of an automobile windowpane independent of which of said vertically spaced apart side confronts said upper end of said stanchion;

said louvers, when detached from said stanchions, being reversible such that any selected one of said louvers can be turned end-for-end to an inverted position to selectively dispose either of said first and second, sides thereof in confronting relation with said upper end of at least one of said stanchions.

20. The interchangeable automobile window louver set recited in claim 19 wherein each of said louvers is mounted on at least two of said mounting stanchions which are disposed on an intermediate portion of each louver longitudinally inwardly of said longitudinally spaced apart ends to cantileverly support said longitudinally spaced apart ends on said at least two of said mounting stanchions.

21. The interchangeable automobile window louver assembly set forth in claim 20 wherein said at least two mounting stanchions include first and second vertical mounting means and said first and second sides include third and fourth longitudinally spaced apart vertical mounting means in vertical alignment with said first and second vertical mounting means, respectively, when said first side bears against said stanchion and in vertical alignment with said second and first vertical mounting means, respectively, when said second side bears against said stanchion.

22. A detachably affixed automobile window louver set, said louver set comprising in combination:
    a plurality of mounting stanchions, and
    a plurality of louvers;
    said plurality of stanchions being adhesively affixable to an automobile window;
    each of said stanchions having a louver detachably affixed thereto with a fastener;
    each of said louvers having a front edge, a rear edge, a first side, a second side, a near end and a distal end;
    said front edge and rear edge of said louvers conforming to an automobile window curvature; and
    said louvers being reversible on the stanchions so that either selected one of said first and second sides is uppermost.

23. An automobile window louver set as claimed in claim 22 wherein said first side of each louver has a predetermined design thereon and said second side has a different design thereon different than said predetermined design.

24. An automobile window louver set as claimed in claim 22 wherein the louvers are interchangeable.

25. An automobile window louver set as claimed in claim 22 wherein the set is configured for a plurality of automobile makes and models.

26. An automobile window louver set as claimed in claim 22 wherein the louvers are contoured.

27. An automobile window louver set as claimed in claim 22 wherein the louvers are constructed such that they gradually increase in depth and length, one from the other.

28. An automobile window louver set as claimed in claim 22 wherein each louver is reversible from top to bottom.

29. An automobile window louver set as claimed in claim 22 wherein the first die of each louver has a different color than the second side of the louver.

30. An automobile window louver set as claimed in claim 24 wherein at least two louvers are used in a series.

\* \* \* \* \*